Jan. 20, 1959     W. J. DICKEY ET AL     2,869,911

SELF-LOCKING SHACKLE SEAL

Filed May 31, 1955

Inventors
Wallace J. Dickey
Kenneth R. McClure
by W. Bartlett Jones,
Attorney

United States Patent Office 2,869,911
Patented Jan. 20, 1959

2,869,911

SELF-LOCKING SHACKLE SEAL

Wallace J. Dickey, St. Charles Township, Kane County, and Kenneth R. McClure, St. Charles, Ill., said Kenneth R. McClure assignor to said Wallace J. Dickey Application May 31, 1955, Serial No. 512,015

5 Claims. (Cl. 292—324)

The present invention relates generally to self-locking shackle seals, better known as car seals, and in particular to an improved construction thereof.

Car seals are designed with two major objectives. A foremost objective is to provide a seal which is tamper-proof, that is, which cannot be unsealed by tampering and so repaired as to conceal the tampering. Another objective is economy in manufacture. Attempts to meet both objectives have resulted in a wide variety of seals over the course of time.

One of the effective structures for the self-locking mechanism is the type shown in Mackey No. 2,343,564 in which the insertion of the free end of a shackle strip into a casing wherein the other end is anchored, displaces a pair of opened spring split rings into a position where they close and remain in a floating position which locks the said inserted end against withdrawal. The locking structure is housed in a casing which generally has a seam or joint subject to being opened by unlawful tampering, but subject to unlawful repair to conceal tampering, for example, by soldering. The present invention may employ numerous self-locking structures, but the above-described type is preferred and is illustrated without any intention of limiting the invention to it.

It is an object of the present invention to provide a seal having a casing which is tamper-proof to the extent that it is incapable of repair.

It is a particular object to provide a casing of metal which is not subject to repair by soldering technique.

A further object of the invention is to provide a seamless hollow casing from a one-piece metal blank.

Various other and ancillary objects and advantages of the invention will become apparent from the following description and explanation of the improved seal and the method of manufacture shown in the accompanying drawings in which.

In accordance with the present invention, the casing is made from a one-piece blank of sheet metal so that there are no seams or joints which may be opened in a manner to permit repair and concealment of tampering. An additional, although optional feature, is the use of a metal which is not easily soldered, such as magnesium or aluminum and which is more easily worked mechanically to convert the sheet metal into hollow casing form.

Figure 1:
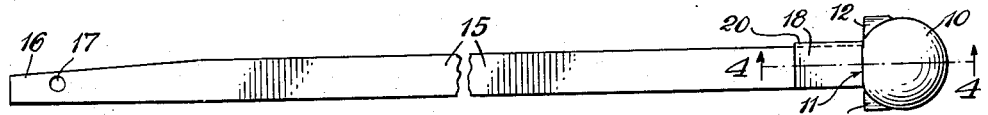
Fig. 1 illustrates a seal of the present invention as commercially supplied.
Figure 3:
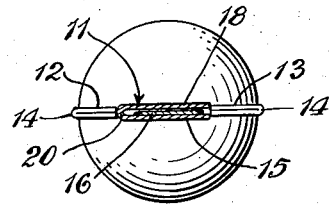
Fig. 3 is a cross-section on the line 3—3 of Fig. 2.
Figure 2:
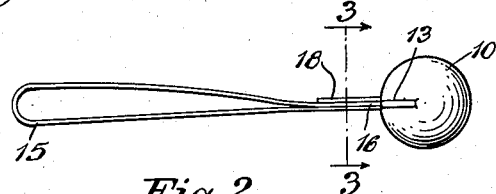
Fig. 2 represents the seal of Fig. 1 in its sealing position.

The seal has a hollow casing 10 of one piece of metal, preferably in the form of an approximate sphere, and preferably of aluminum. A slot 11 therein is flanked in Fig. 1 by a pair of wings 12 and 13 which are non-functional, yet a desirable result from the method of manufacture. Each wing is a flat folded piece of two layers of metal comprising excess metal from an original tubular form that is swaged into substantially hemispherical form in the final act of closing the casing 10 in manufacture. The wings may be cut away, but it is preferred to retain them, since the edges 14 thereof are folds, making access to the interior very difficult by separating the layers of a wing. Should the layers forming said wings be spread apart the tampering would be readily apparent.

Emerging from the slot 11 is a metal strip 15 tapered at its free end 16 to narrow the width thereof. The free end of the strip 15 has a detent structure to cooperate with means in the casing to lock the end within the casing. The preferred detent structure is shown as a hole 17 positioned to register with a similar hole or holes within the casing when using the preferred locking means as later described.

Also emerging from the slot 11 is a strip 18 superimposed over the strip 15 and so mounted as to provide a space 19 between them into which the said free end 16 of the shackle may be inserted. The strip 18 projects a slight distance from the casing so that the two superimposed strips provide a guide to facilitate inserting the free end 16 between them.

It is preferred that the strips 15 and 18 be integral and various relationships are possible. This may be effected by folding heet material to bring to areas thereof face to face to provide the superimposed strips between which the free end is inserted. As shown, the two spaced pieces of metal are made integral by folding a piece with a wider end portion along an edge to form a fold 20 in extension of the edge of strip 15. The fold 20 functions somewhat as the bottom of a channel of which the strips 15 and 18 are the channel flanges, and of which the width of the channel is the space 19 to receive the free end 16 of the strip 15.

Within the casing 10, the strips 15 and 18 at their ends make contact with the rear wall of casing 10 and have registering terminal elongated recesses 22 and 23, forwardly of which are registering holes 24 and 25 to register with the hole 17 in the locked position.

Forwardly of the holes 24 and 25 on each strip are areas on which lie the ends of split rings 26 and 27. These rings are held open by one or both of the pieces of metal, or as shown, by the described channel structure and on being moved toward the rear of the casing 10 the ring ends enter the holes 24 and 25 and close. When the free end 16 of the strip 15 is inserted into the casing, it pushes the ring portions 28 which lie in the recesses 22 and 23 toward the rear of the casing and when the rings reach the holes 24 and 25, the hole 17 is positioned to register with them and the locking is effected. Two rings independently floating in locking position make it practically impossible for the two splits of the rings to be together at the same time in a position to permit both of them being pried open by tampering through the slot 11.

Means is provided to maintain the split rings in proper positions for movement in their intended track. The preferred means is in the form of obstructions laterally of the path to prevent lateral slippage of the rings. Such obstacles may be provided by a single depression or by two upset ridges.

Figure 4:
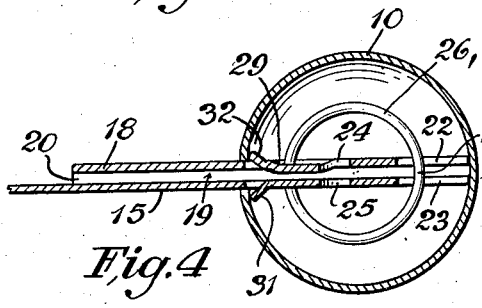
Fig. 4 is an enlarged vertical cross-section of the casing on line 4—4 of Fig. 1.
Figure 5:
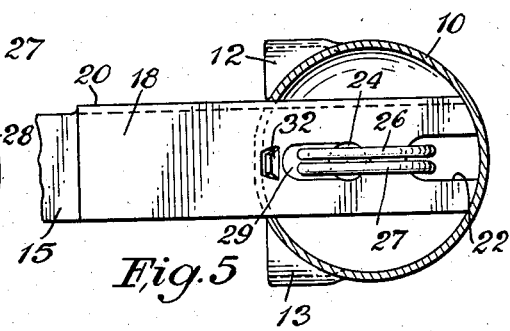
Fig. 5 is a horizontal cross-section of the casing of Fig. 4 showing in plan view the interior locking structure.
Figure 6:
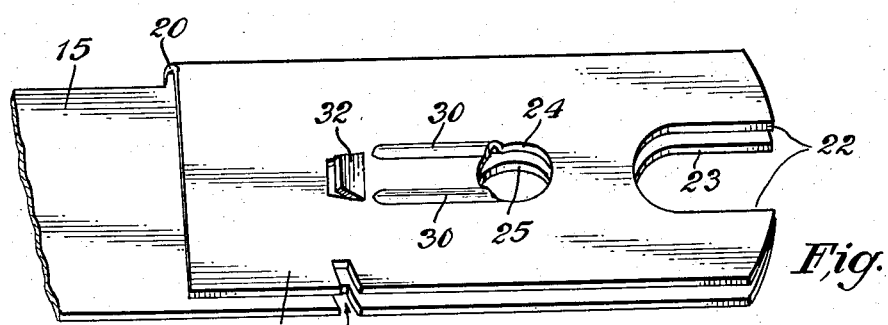
Fig. 6 is an enlarged and modified form of the folded element of Figs. 4 and 5.
Figure 7:
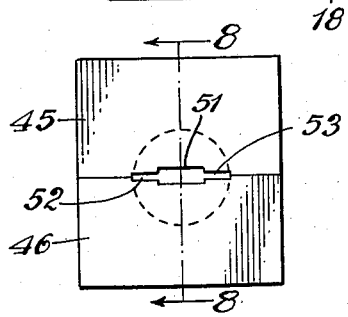
Fig. 7 is a front view of the die shown in Fig. 8 for forming the casing about its interior parts.
Figure 8:
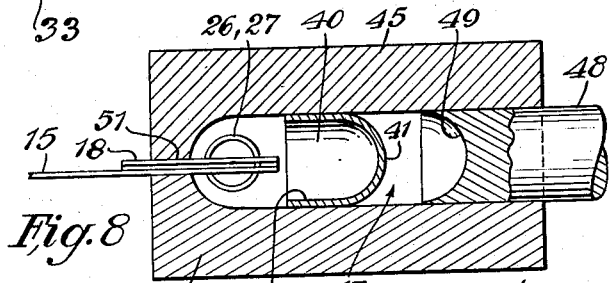
Fig. 8 is a vertical cross-section of the die on line 8—8 of Fig. 7.

On at least one of the strips 15 and 18, the area which normally holds the split rings in their sensitive position is depressed as shown at 29 in Figs. 4 and 5 forwardly from a hole 24 or 25 to provide by its edges lateral obstructions and thus prevent the rings from being laterally displaced from their intended line of motion for locking. In Fig. 6, the depression is lacking and two upset ridges 30 are formed substantially tangent to a hole 24 or 25.

To hold the strips 15 and 18 in the casing against withdrawal, anchoring means is provided. In one form, at least one and preferably both of the strips 15 and 18 have outturned ears 31 and 32, struck from the middle of the strip. These ears are positioned and bent so as to lie against the interior forward wall of the casing 10 when the casing is formed about the locking structure. In Fig. 6, another form of detent is shown, which may be substituted for the ears 31—32, but which is preferably used to supplement the function of said ears. Recess 33 in the edge of one, and preferably both, of the strips opposite the fold 20 is formed at a location to receive metal as the casing is being formed about the locking structure. Although a like recess may be made in the fold-edge opposite recess 33 for the same function, it is preferred to maintain the fold 20 unbroken as a guiding way for inserting the free end 16.

In manufacture, the locking means of the kind illustrated, or of any other form, is assembled and the casing is formed around the locking structure. One manner of accomplishing this is to form first from sheet metal in any well-known manner a tubular form with one closed end and an open end, such as the cylindrical thimble 40 having a substantially hemispherical end 41 and an open ended tubular body 42 of suitable length to be closed as now described. The thimble 40 is placed in a two-part die-block having upper section 45 and lower section 46 and forming between them a space 47 of size exactly to house the thimble 40. The space 47 opens to the rear of the die-block to receive a close-fitting plunger 48 with a recess 49 in its end to fit the end 41 of thimble 40. The forward end of the space 47 is rounded, preferably in hemispherical form, and functions to swage the thimble body 42 into a rounded closure form when the plunger 48 feeds the thimble forwardly in the die-block, into which the assembled locking structure has been placed. The thimble 40 is preferably of a length so that the two hemispherical closure forms are complementary to form a spherical casing.

The forward end of the die-block has a slot 51 located at the interface of the two sections to receive the strips 15 and 18 and lateral extensions 52 and 53 of the slot providing spaces to receive excess metal of the thimble cylinder 42 as it is formed into the completed casing. The excess metal entering the spaces 52 and 53 comprises two folded layers highly compressed together which are the wings 12 and 13 with edge-folds 14. It is to be understood that the die-block may be constructed to form more than two spaces for excess metal so that a plurality of wings may be formed.

The thrust of the plunger 48 must be accurately guaged so that when the swaging is completed the resulting slot 11 formed by the top edge of the thimble 40 has the proper width to permit inserting the free end 16 of the strip 15 between itself and strip 18.

In the form of Fig. 4, the ears 31 and 32 are preformed in position to lie within the casing wall to be formed between them and the die. In the form of Fig. 6, the recess 33 may be duplicated on the opposite edge, and then the ears 31 and 32 may be omitted. The one or two recesses 33 are positioned to receive the casing metal being shaped, and since such entry of the casing metal into a recess 33 will shorten the slot 11 into which the free end 16 is to be inserted, the said free end must be sufficiently narrow to pass the metal in a recess 33.

In the locking structure described, it is advantageous to have the strips 15 and 18 connected by the fold 20 and to have the resulting channel project from the casing 10. The slot formed by space 19 and the edges of the casing may be controlled in size so that when the free end 16 is locked within the casing there is no opening, other than effective clearance space, into which a tampering probe may be inserted in attempts to open the two rings and unlock the seal. By this expedient, it becomes more difficult to probe into the casing by way of slot 11 between the strips 15 and 18.

From the foregoing, it is to be understood that the seal is not limited to the exact structure illustrated and described and that numerous changes and modifications are contemplated as falling within the scope of the appended claims.

We claim:

1. A shackle seal comprising a hollow casing having a slot opening into the casing, a metal sealing strip emerging from the casing through only a portion of said slot and having a free end adapted to enter the casing through the remainder of said slot, detent means at said free end of the strip, means anchoring said strip within the casing, split-ring means within the casing for automatically engaging said detent means and thereby locking said free end within the casing upon insertion of said free end to a predetermined depth, said casing being formed of one piece of metal, having a rounded closure form opposite said slot and having a rounded closure form containing said slot, said slot being of size incapable of passing said ring means from the interior to the exterior of the casing, said casing having a plurality of integral wings projecting therefrom, each wing having two layers of metal in contact and two edges at an angle to each other, one edge being a fold for the two layers of metal and the other edge of the wing presenting metal edges of the two layers in continuation of the edges of the casing defining the slot.

2. A shackle seal comprising a hollow casing having a slot opening into the casing, a metal sealing strip emerging from the casing through only a portion of said slot and having a free end adapted to enter the casing through the remainder of said slot, detent means at said free end of the strip, means anchoring said strip within the casing, split-ring means within the casing for automatically engaging said detent means and thereby locking said free end within the casing upon insertion of said free end to a predetermined depth, said casing being formed of one piece of metal, having a rounded closure form opposite said slot and having a rounded closure form containing said slot, said slot being of size incapable of passing said ring means from the interior to the exterior of the casing, said casing having two integral wings projecting therefrom and alined with said slot, each wing having two layers of metal in contact and two edges at an angle to each other, one edge being a fold for the two layers of metal and the other edge of the wing presenting metal edges of the two layers in continuation of the edges of the casing defining the slot.

3. The method of making a self-locking shackle seal with a one-piece casing which comprises deforming a blank of sheet metal to tubular form having an open end and a closed end, inserting within said open end locking means and two associated spaced pieces of sheet metal of which one extends away from the two pieces as a shackle strap, and deforming said open end of said tubular form about the inserted structure to house the locking means and to provide entry to the casing through the space between said pieces, and in deforming said open end squeezing excess metal laterally away from the casing wall as a plurality of wing-form projections each consisting of two folded-together layers of metal in contact.

4. The method of making a self-locking shackle seal with a one-piece casing which comprises deforming a blank of sheet metal to cylindrical tubular form having a substantially hemispherical closed end and an open circular end, inserting within said open end locking means and two associated spaced pieces of sheet metal of which one extends away from the two pieces as a shackle strap, and deforming said open end of said tubular form into a substantially hemispherical form about the inserted structure to house the locking means and to provide entry to the casing through the space between said pieces, and in deforming said open end squeezing excess metal laterally away from the casing wall as a plurality of wing-form projections each consisting of two folded-together layers of metal in contact.

5. The method of making a self-locking shackle seal with a one-piece casing which comprises deforming a blank of sheet metal to cylindrical thimble form having a substantially hemispherical closed end and an open circular end, inserting within said open end locking means and two associated spaced pieces of sheet metal of which one extends away from the two pieces as a shackle strap, and deforming said opened end of said thimble form into a substantially hemispherical form substantially complementary to the closed end of the thimble and about the inserted structure to house the locking means and to provide entry to the casing through the space between said pieces, and in deforming said open end squeezing excess metal laterally away from the forming sphere as two wing-form projections alined with the said two pieces of metal, each wing consisting of two folded layers of metal in contact.

References Cited in the file of this patent

UNITED STATES PATENTS

| | | |
|---|---|---|
| 447,266 | Wilmot et al. | Feb. 24, 1891 |
| 594,580 | Tyden | Nov. 30, 1897 |
| 629,939 | Tyden | Aug. 1, 1899 |
| 777,868 | Tyden | Dec. 20, 1904 |
| 896,244 | Reesor | Aug. 18, 1908 |
| 1,016,985 | Davis | Feb. 13, 1912 |
| 1,026,943 | Brooks | May 21, 1912 |
| 1,106,860 | Bayton | Aug. 11, 1914 |
| 2,454,927 | Kalwo | Nov. 30, 1948 |
| 2,768,848 | Mitchell et al. | Oct. 30, 1956 |

FOREIGN PATENTS

| | | |
|---|---|---|
| 575,229 | Great Britain | Feb. 8, 1946 |